June 13, 1961   R. J. PURNELL   2,988,298
FISHING REEL
Filed May 21, 1957   3 Sheets-Sheet 1
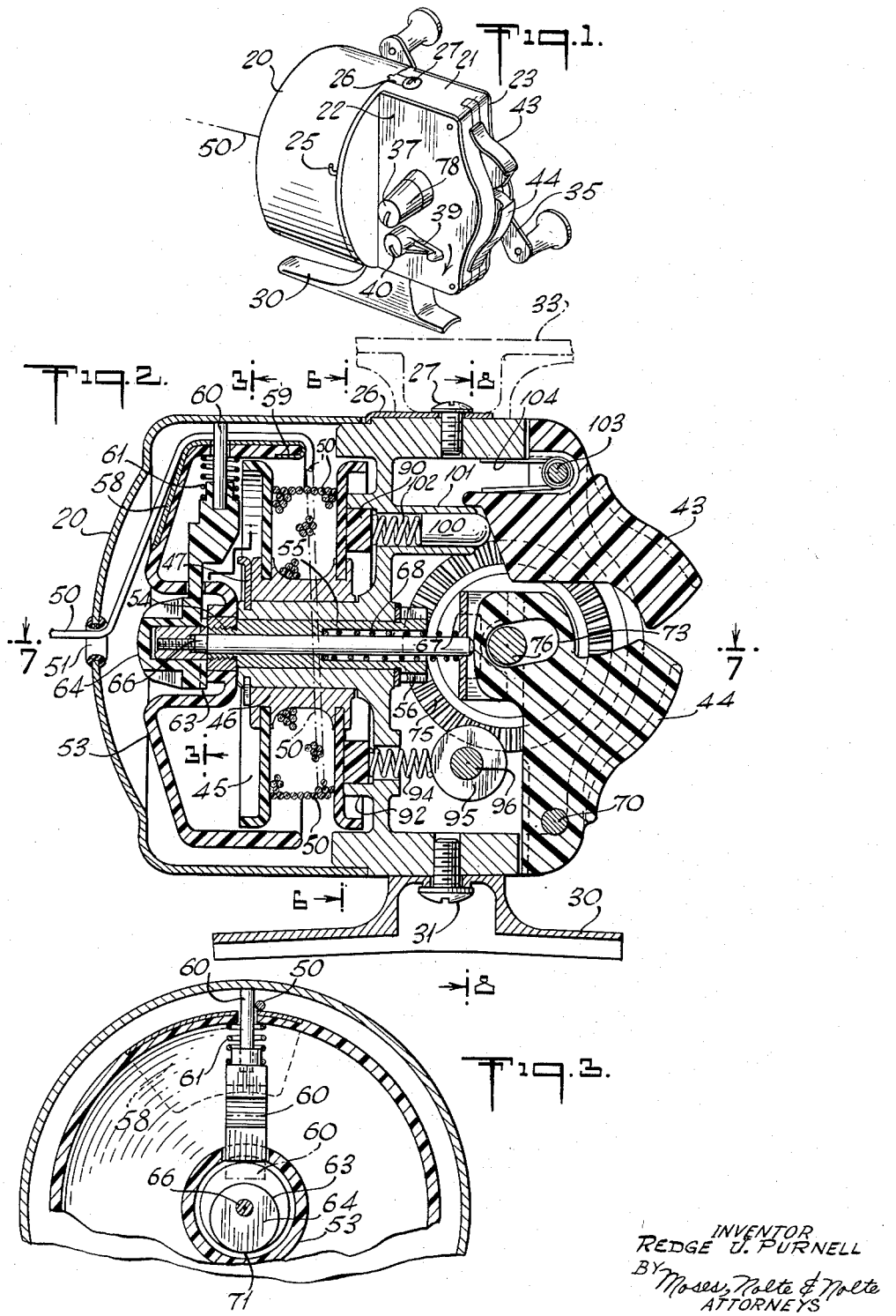
INVENTOR
REDGE J. PURNELL
BY Moses, Nolte & Nolte
ATTORNEYS

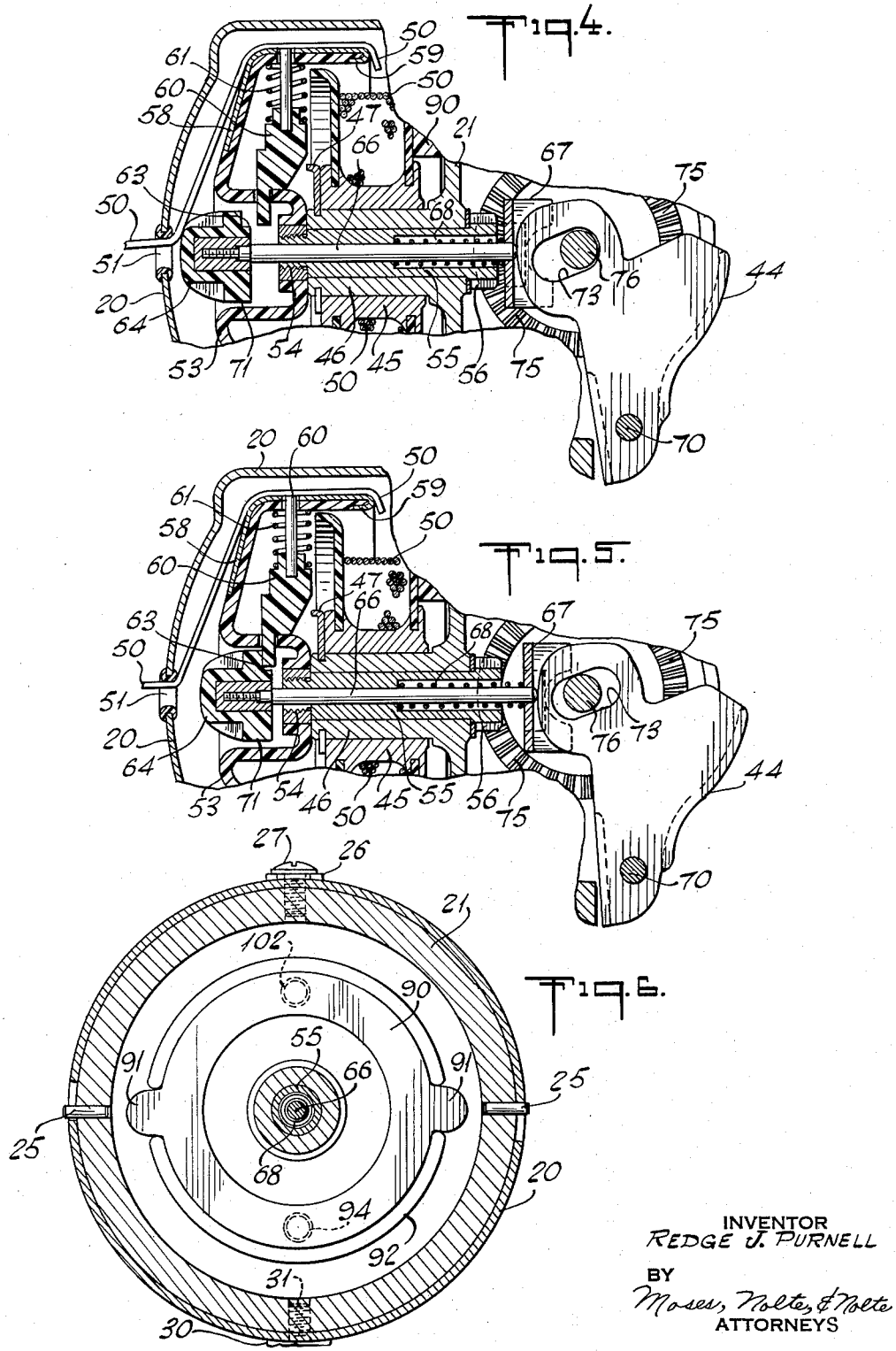

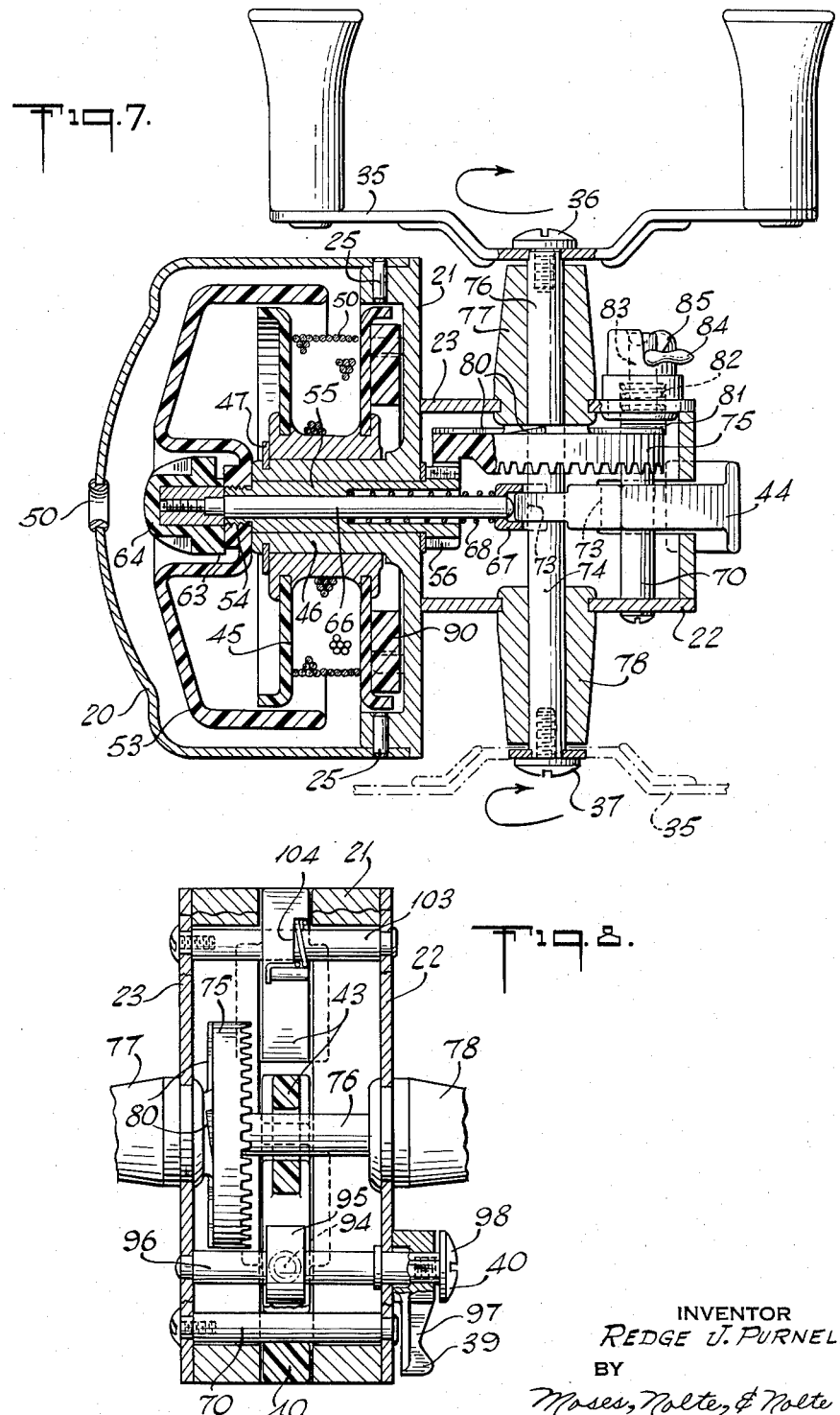

United States Patent Office 2,988,298
Patented June 13, 1961

2,988,298
FISHING REEL
Redge J. Purnell, Baldwin, N.Y., assignor to The Lionel Corporation, New York, N.Y., a corporation of New York
Filed May 21, 1957, Ser. No. 660,721
4 Claims. (Cl. 242—84.5)

The present invention relates to fishing reels, particularly of the type in which the line is wound on a non-rotating reel by a rotating pick-up device.

According to the invention, the reel or spool is held stationary during winding and the line is wound on the spool by a pick-up device driven through a gear train by a winding crank. Adjustable braking means are provided for applying a desired amount of frictional drag to the spool. Additional braking power may be applied by a thumb operated lever for applying a controllable amount of braking when the line is being taken out by a fish. The line pick-up device comprises a cone, which covers the front end of the reel and a portion of its periphery. The line is wound round the reel by a pin which extends through the cone. The pin is urged inwardly by a spring in order to retract it from its operable position. The pin is moved outwardly into its operable position by a camming device connected to a non-rotating reciprocable shaft. A casting lever protruding from the rear end of the casing is adapted to push the rod forward in order to take the pin assembly off the cam surface of the camming device and allow a spring associated therewith to retract the pin. When the lever is released, a spring moves the reciprocating rod rearwardly to bring the camming surface into engagement with the pin assembly, so that upon rotation of the pick-up mechanism, the pin assembly will be moved outwardly into its operable position. When the pin is retracted by moving the casting lever inwardly not quite all the way, the line will coil off the spool, while the spool remains stationary. During casting the line is allowed to spool off as much as desired and then the line is snubbed by pressing the casting lever all the way. When the pin engages the line and the line is pulled out, the pick-up mechanism, the gearing and crank handle attached thereto, will be turned backwardly. An anti-reversing lock is provided which may be set so as to prevent backward rotation of the gearing. A brake lever is mounted immediately above the casting lever so that either may be operated by the thumb. A further feature is that the crank handle can be mounted on either the right side or the left side of the reel. The casing of the reel is provided with a foot adapted to engage a fishing rod and the foot itself may be mounted on the top or bottom of the casing.

One object of the invention is to provide an improved winding mechanism for a fishing reel.

Another object of the invention is to provide braking means including a manually operated brake for continuously controlling the amount of braking applied to the rotation of the spool.

Other objects and features of the invention will be apparent to those skilled in the art from the following description and the drawings in which:

FIG. 1 shows a perspective view of the fishing reel;
FIG. 2 is a sectional view taken along a median vertical plane;
FIG. 3 is a partial sectional view taken along the line 3—3 of FIG. 2;
FIG. 4 is a partial sectional view with the casting lever fully depressed;
FIG. 5 is a sectional view similar to that of FIG. 4 showing the casting lever in its released position;
FIG. 6 is a sectional view taken along the line 6—6 of FIG. 2;
FIG. 7 is a sectional view taken along the line 7—7 of FIG. 2;
FIG. 8 is a sectional view taken along the line 8—8 of FIG. 2.

Referring to the drawing, the reel has a casing including a gathering face assembly 20, a frame 21 and end plates 22 and 23. Gathering face 20 is fastened to the frame by pins and bayonet slots 25 and also by a locking plate 26 and a screw 27 fastening the locking plate to the frame. A foot 30 adapted to engage a fishing rod, may be connected to the bottom of the frame by a screw 31 or to the top of the frame by the screw 27, as indicated in dotted line 33 (FIG. 2). A winding handle assembly 35 is adapted to be connected to the right side or left side of the frame by screws 36 or 37. On the left side of the frame, there is also a lever 39 fastened by a screw 40 adapted to apply an adjustable amount of braking power in the manner to be described later. At the rear of the frame, there are a pair of levers 43 and 44, the upper lever 43 being a braking lever and the lower lever 44 being a casting lever. The operation of the levers will be described fully hereinafter.

A spool 45 is rotatably journaled in a bearing 46 and held in place by a retaining ring 47. A line 50 extends through an opening lined with a collar 51 in the gathering face 20 and is adapted to be wound on the spool. The front end of the spool and about half of its periphery is covered by a pick-up cone 53 which is threaded at 54 on a rotatable shaft 55 having a pinion 56 at the rear end thereof. The pick-up cone 53 may be formed of a plastic material. A portion thereof is covered by a metallic plate 58 extending along a portion of the front face of the cone, over the top thereof, and then is bent around the rim of the cone as indicated at 59. The cone and the metallic plate have registered openings through which a pin assembly 60 extends. A spring 61 urges the pin assembly inwardly against a camming surface 63 of a cam device 64 threaded on one end of a reciprocable non-rotatable shaft 66. The shaft is attached to a bracket 67 against which a compressed spring 68 acts to urge the shaft rearwardly. When lever 44 is pressed, it pivots about the fulcrum 70 and moves bracket 67 and shaft 66 forwardly to the position shown in FIG. 4. The cam device 64 then moves out of engagement with the pin assembly 60 and allows spring 61 to retract the pin assembly and the casting lever 44 may be then released to take the position shown in FIG. 5. In this position, during casting, the line 50 is free to coil off spool 45 while the latter remains stationary. When the line has been cast as far as desired lever 44 is moved inwardly all the way to the position shown in FIG. 4 and the line is then snubbed between collar 51 and cam device 64 to stop the feeding of the line. If now the cone 53 is rotated, the pin assembly will travel around the camming surface 63 and when it reaches the side 71, spring 68 will push bracket 67 and shaft 66 forwardly into the position shown in FIG. 2, and the pin assembly 60 will then have been moved outwardly to the position shown in FIG. 2. The pin assembly when rotated will then engage the line and wind it around the spool 45. Lever 44 is provided with a slot 73 surrounding the handle assembly shaft 76.

For the purpose of driving pick-up cone 53, gear 56 meshes with a gear 75 fixed to a shaft 76 which extends through hubs 77 and 78 on the left and right sides of the housing. A double grip winding handle assembly 35 is fastened to either end of shaft 76 by screws 36 or 37, as indicated in FIG. 7. Thus, rotation of handle 35 drives shaft 55 and rotates the pick-up cone 53. The pin assembly 60, when extended, engages the line and spools it on the reel, which has enough frictional drag to remain stationary.

The back of gear 75 is provided with a ratchet 80 adapted to be engaged by a pawl 81, which is pressed into engagement with the ratchet by a spring 82. Pawl 81 is fastened to a shaft 83 having a lever 84 extending laterally therefrom. The lever or arm 84 may be turned against a camming surface 85 to pull pawl 81 out of engagement with the ratchet against the pressure of spring 82. When pawl 81 engages the ratchet, gear 75 cannot rotate in the reverse direction. This prevents the pick-up cone from rotating in the reverse direction and consequently prevents the line from being pulled out when sufficient braking power is applied to spool 45.

A brake disc 90 having projections 91 is held in a bifurcated annulus 92 against rotation. The forward end of brake disc 90 is in contact with the rear face of spool 45. Braking power may be applied to disc 90 through a coil spring 94 having one end in engagement with the brake disc and the other end in engagement with a cam 95 mounted on shaft 96. Shaft 96 is journaled in the frame as shown in FIG. 8. A lever 97 is fastened by a screw 98 to shaft 96 and is arranged so that it can be turned through about one quadrant. As the lever 97 is turned, cam 95 compresses spring 94 more or less, thus applying an adjustable braking power to brake disc 90 to provide a frictional drag against rotation of spool 45. When braking power is thus applied, during spin casting, the line coils off the stationary spool. There is thus no friction of a turning reel and hence no possibility of line binding, and no backlash.

Additional braking power may be provided by the lever 43 which acts against a pin 100 in a sleeve 101. The sleeve also contains coil spring 102 between pin 100 and brake 90. Lever 43 pivots about a fulcrum 103 and is provided with a spring 104 which moves lever 43 outwardly so that, normally, lever 43 applies no appreciable amount of braking power. When lever 43 is pressed, braking power is applied to disc 90 through spring 102 and provides additional frictional drag on spool 45. This enables the operator to closely control the amount of frictional drag when the line is being pulled out by a fish.

For purposes of illustration, there has been disclosed one preferred embodiment of my invention, but it will be apparent to those skilled in the art that many modifications and variations thereof may be made within the spirit and scope of my invention as defined in the following claims.

I claim:

1. In a fishing reel including a rotatable shaft member, line pickup means affixed to said shaft member for rotation therewith, a line spool rotatable relative to said shaft member, and crank means to rotate said shaft member, the improvement comprising combination drag adjustment and brake means including a friction member adjacent a side of said spool capable of lateral displacement against said spool to retard rotation thereof, first adjustable biasing means acting on said friction member to control the drag on said spool, and second adjustable biasing means including a thumb lever pivotally mounted adjacent said friction member and effective to brake said spool under the force of thumb pressure applied braking pressure.

2. In a fishing reel according to claim 1, wherein said friction member is an annular ring, and wherein said first adjustable biasing means includes a spring biased against said ring, and means for adjusting the biasing force of said spring.

3. In a fishing reel according to claim 2, wherein said pickup means, shaft member and said spool are enclosed by a casing, said means to rotate said shaft member including a crank arm extending outwardly from one side of said casing, and wherein said thumb lever is pivotally mounted on said casing and includes a portion extending outwardly from the rear thereof for engagement by the thumb for braking the line.

4. In a fishing reel including a rotatable shaft member, line pickup means affixed to said shaft member for rotation therewith, a line spool rotatable on said shaft member, crank means to rotate said shaft member, a casing enclosing each of said pickup means, said shaft member and said line spool, and including an opening in said casing for the passage of line therethrough, and a thumb lever pivotally mounted on said casing and including a portion projecting outwardly therefrom for engagement by the thumb; the improvement comprising an annular friction member adjacent an edge of said spool and capable of lateral displacement against said spool to retard rotation thereof relative to said shaft member, diametrically opposite first and second spring means including one end of each in contact with said ring member, said first spring means including a portion engageable by said thumb lever for increasing the biasing force of said first spring means against said ring member, and rotatable knob drag setting means including an eccentric in engagement with said second spring means and movable against said second spring means to vary the biasing force thereof.

References Cited in the file of this patent

UNITED STATES PATENTS

| | | |
|---|---|---|
| 2,034,917 | Miller | Mar. 24, 1936 |
| 2,055,448 | Adams | Sept. 22, 1936 |
| 2,507,457 | Rix | May 9, 1950 |
| 2,521,543 | Shakespeare et al. | Sept. 5, 1950 |
| 2,536,288 | Hurd | Jan. 2, 1951 |
| 2,544,962 | Legg | Mar. 13, 1951 |
| 2,600,558 | Mauborgne | June 17, 1952 |
| 2,602,603 | Blissit | July 8, 1952 |
| 2,641,419 | Cowen et al. | June 9, 1953 |
| 2,644,647 | Denison et al. | July 7, 1953 |
| 2,656,993 | Dukes | Oct. 27, 1953 |
| 2,668,025 | Hull | Feb. 2, 1954 |
| 2,675,192 | Hull | Apr. 13, 1954 |
| 2,716,301 | Lockwood | Aug. 30, 1955 |
| 2,772,839 | Morton | Dec. 4, 1956 |
| 2,777,645 | Wood | Jan. 15, 1957 |
| 2,903,201 | Sarah | Sept. 8, 1959 |
| 2,903,202 | Sarah | Sept. 8, 1959 |

FOREIGN PATENTS

| | | |
|---|---|---|
| 737,191 | Great Britain | Sept. 21, 1955 |